United States Patent [19]

Babel et al.

[11] Patent Number: 5,296,285
[45] Date of Patent: Mar. 22, 1994

[54] HIGH EMITTANCE LOW ABSORPTANCE COATINGS

[75] Inventors: Henry W. Babel, Huntington Beach; Huong G. Le, Fountain Valley, both of Calif.

[73] Assignee: McDonnell Douglas Corporation, Long Beach, Calif.

[21] Appl. No.: 887,851

[22] Filed: May 26, 1992

[51] Int. Cl.$^5$ ................................. B32B 7/02
[52] U.S. Cl. .................... 428/213; 428/323; 428/335; 428/457; 428/469; 428/689; 428/702; 244/158 A; 106/425; 106/428
[58] Field of Search .......... 244/158 R, 158 A; 106/286.4, 425, 426, 428; 428/207, 209, 323, 335, 469, 471, 689, 702, 213, 457; 205/328; 252/587; 148/276

[56] References Cited

U.S. PATENT DOCUMENTS

| | | | |
|---|---|---|---|
| 2,018,388 | 10/1935 | Tosterud | 148/6 |
| 3,454,410 | 7/1969 | Schutt et al. | 106/74 |
| 3,607,338 | 7/1971 | Webb | 106/428 |
| 3,620,791 | 11/1971 | Krupnick | 106/415 |
| 4,098,194 | 7/1978 | Miller et al. | 244/158 A |
| 4,111,851 | 9/1978 | Shai | 252/518 |
| 4,397,716 | 8/1983 | Gilliland et al. | 204/33 |
| 4,526,671 | 7/1985 | Watanabe et al. | 204/37.6 |
| 4,559,439 | 4/1987 | Watanabe et al. | 204/37.6 |

OTHER PUBLICATIONS

Kirk-Othmer Encyclopedia of Chemical Technology, vol. 15, pp. 309-310 (3rd ed., 1981).

*Primary Examiner*—Patrick J. Ryan
*Assistant Examiner*—Marie R. Macholl
*Attorney, Agent, or Firm*—Max Geldin

[57] ABSTRACT

An aluminum or aluminum alloy substrate having a low absorptance high emittance two-layer coating produced by first anodizing the substrate to form an anodic coating, followed by applying a topcoat of an inorganic white paint on the anodic coating, such dual layer coated substrate having spacecraft application, particularly for radiators.

7 Claims, No Drawings

HIGH EMITTANCE LOW ABSORPTANCE COATINGS

The invention described herein was made in the performance of work under NASA Contract No. NAS9-18200 and is subject to the provisions of Section 305 of the National Aeronautics and Space Act of 1958 (42 U.S.C. 2457).

BACKGROUND OF THE INVENTION

This invention relates to producing a high emittance, low absorptance multilayer coating on aluminum or its alloys, and is particularly concerned with the provision of an inorganic coating on anodized aluminum or its alloys, having a low absorptance with controlled high emissivity and a minimum coating weight, and with procedure for achieving such a multilayer coating.

In space, there is no atmosphere to conduct heat to or from a spacecraft. Therefore, all heat gain or loss must be by radiation. Radiation is accomplished through the use of thermal control surfaces which can absorb solar radiation and emit radiation to space. These surfaces have a range of desirable values for solar absorptivity ($\alpha$) and infrared emissivity ($\epsilon$). For surfaces such as the radiators, it is important to absorb as little solar radiation as possible (low $\alpha$) while radiating as much heat as possible to space (high $\epsilon$).

The $\alpha$ and $\epsilon$ properties of the thermal control surfaces must be stable to maintain the temperatures of the spacecraft in the range required for effective operation. However, spacecraft which are in orbit near the earth (commonly called the low earth orbit or LEO) experience a hostile space environment consisting of atomic oxygen, ultraviolet radiation, charged particles, and contamination from other spacecraft components. These factors have been known to degrade the optical properties of spacecraft thermal control surfaces.

The development of a suitable long-life thermal control coating particularly on aluminum or its alloys, is therefore essential for the longevity of spacecraft structures. This coating must also be economical and easy to handle and apply to structures. Common radiator coatings include organic and inorganic white paints, silver-coated TEFLON films, and silver-coated quartz tiles and anodic coatings. Although organic coatings can provide the desired optical properties, such as silicone and fluorocarbon base coatings, they are attacked and erode in the LEO environment. Inorganic paints can achieve high emissivity but when applied to aluminum or alloys thereof, the substantial thickness of such paint coating causes it to weigh more than anodic aluminum coatings. In addition, the application of an inorganic paint to a bare aluminum surface provides substantially no corrosion protection and consequently requires strict environmental control from time of manufacture to flight into space. TEFLON is not resistant to the LEO environment. Quartz tiles have been very labor intensive to install particularly for the complex geometry of most spacecraft and are quite fragile. Anodic coatings of aluminum are one of the most attractive thermal coating systems because of the thinness and hence light weight of the anodic coating, it is integral with the aluminum substrate, it does not spall or chip even from micrometeoroid/debris impact, it provides corrosion protection terrestrially, and is completely resistant to erosion from atomic oxygen. In addition, relatively high emissivities can be obtained.

Anodizing is an electrolytic process that produces an oxide film on the surface of a metal. When aluminum is anodized in a sulfuric acid electrolyte, a porous film of aluminum oxide is formed on the surface of the part. Anodized 5657 aluminum represents a promising candidate for the thermal control coating of the radiators. While anodized aluminum surfaces have high emissivities, the drawbacks associated with anodic coatings is the undesirably high solar absorptance obtained with some anodized aluminum alloys and the increase in solar absorptance that occurs with LEO space exposure.

Representative of the prior art is U.S. Pat. No. 4,526,671, directed to the coloration of aluminum and its alloys for use as decorative materials and the like. According to the patent a white or grayish white substance can be formed by dipping, in the first step, aluminum or an aluminum alloy having an anodically oxidized film in a first solution containing a specific salt or electrolyzing with the first solution, thereby causing the product from this salt to enter into the micropore of said film and then, in the subsequent second step, dipping the product from the first step in a second solution containing a substance which reacts with the product from the salt to be converted into a white or grayish white compound or electrolyzing with the second solution.

U.S. Pat. No. 4,111,851 discloses a coating characterized by low thermal absorption, high thermal emittance and high electrical conductivity comprising (a) a fired oxide pigment comprising a minor amount of aluminum oxide and a major amount of zinc oxide; (b) a vehicle-binder comprising an alkali metal silicate; and (c) sufficient water to provide a mixture suitable for application to a substrate. The fired oxide pigment may further include a minor amount of cobalt oxide. The resulting coating is particularly useful for coating the surfaces of spacecraft and similar objects. The patent states that aluminum can be used as a substrate but that anodized aluminum should be avoided.

U.S. Pat. No. 4,397,716 discloses anodizing aluminum surfaces in chromic acid as the anodizing electrolyte to obtain an anodized coating adapted to be exposed to solar radiation and having a thermal emittance in the range of 0.10 to 0.72 and a solar absorptance in the range of 0.2 to 0.4. However a higher thermal emittance is required for more efficient spacecraft thermal surfaces, as noted above.

One object of the invention is to provide a high emittance low absorptance coating on aluminum or its alloys.

Another object is the provision of a multilayer coating on aluminum or its alloys having low absorptance with controlled high emissivity and a minimum coating weight.

A still further object is to provide a coating having the above characteristics on an anodized aluminum substrate surface, and which provides corrosion protection without special environmental controls.

Yet another object is the provision of procedure for achieving the above coatings.

SUMMARY OF THE INVENTION

The above objects and advantages are achieved by the application of an inorganic topcoat of white paint on an anodized aluminum surface. Thus, a high emittance low absorptance coating having minimum weight is achieved according to the invention which comprises an aluminum or an aluminum alloy substrate having an anodized surface and a topcoat of an inorganic white paint on the anodic coating of said anodized surface.

The concept of applying an inorganic coating of white paint to an anodic coating on aluminum or its alloys, to provide controlled solar absorptivity and infrared emissivity, is applicable to various forms of anodizing procedures, and inorganic white paints of various types can be employed as topcoat, as described in greater detail hereinafter.

According to a preferred embodiment, an anodic coating on an aluminum alloy substrate was topcoated with between 1 and 1.5 mils of an inorganic white paint to form two layers on the substrate having a total coating thickness of only about 2 mils, while at the same time providing a coating having a low absorptance with controlled high emissivity.

The thin two-layer coating of the present invention can unexpectably save an approximately 7% in weight of the radiators compared with a thicker single layer of inorganic paint applied to an unanodized aluminum or aluminum alloy substrate, to achieve comparable low absorptance and high emissivity values.

According to another embodiment, however, the thicker 5 to 6 mils coating of white inorganic paint can be applied on an anodized aluminum or aluminum alloy surface to provide the desired low absorptance and high emittance, but in addition to provide corrosion resistance.

DETAILED DESCRIPTION OF THE INVENTION AND PREFERRED EMBODIMENTS

Aluminum or any of its alloys can be employed as substrate according to the invention. These include, for example, the 5,000 series of aluminum alloys containing Mg as a primary alloying element, the 7,000 series containing Zn as primary alloying element, the 2,000 series containing Cu as a primary element and the 6,000 series containing Mg and Si as a primary alloying element. The invention is also applicable to other aluminum alloys, and including clad aluminum alloys. A particularly useful alloy is 6061-T6 aluminum alloy.

Any conventional or standard procedure can be employed for anodizing the aluminum or aluminum substrate. A well known procedure employs aqueous sulfuric acid as anodizing electrolyte, e.g. an 18% by weight sulfuric acid bath at room temperature. The electrolytic process can be carried out employing direct current. Thus, for example, using the aluminum or aluminum alloy part as anode, and lead or aluminum as the cathode, voltage of the order of about 15 volts can be applied with a current density in the range of about 12 to 13 amperes/ft$^2$. Under such conditions, anodizing can be carried out for a period of about 45 minutes.

Prior to anodizing, sample preparation of the aluminum or aluminum alloy substrate is carried out. In the initial preparation step, the aluminum or aluminum alloy sample is subjected to alkaline cleaning as by treatment in a suitable alkaline cleaner such as Turco 4090, a soap-like proprietary cleaner marketed by Turco Products, Inc. of Westminster, Calif., at elevated temperature, followed by rinsing with water. For suitable aluminum alloys, the resulting substrate surface is then subjected to chemical brightening by use of a generally acid solution. In preferred practice, the substrate surface is brightened by immersion in a solution of a mixture of phosphoric and nitric acids resulting in a shiny surface. The so-treated substrate is then rinsed with water.

Following anodizing, the anodic coating is sealed by immersion in a demineralized water bath at elevated temperature, e.g. about 200° F. (93° C.) for a short period, followed by air drying. Other sealing techniques are also suitable.

As previously noted, various inorganic white paints can be applied to the anodic coating layer formed on the anodized aluminum or aluminum alloy substrates. An example of an available inorganic white paint is the paint marketed as Z-93 by Illinois Institute of Technology Research Institute (IITRI), understood to be comprised of zinc oxide particles and potassium silicate binder. Another inorganic white paint which can be employed is the paint YB-71 also marketed by IITRI, understood to be comprised of zinc orthotitanate particles and potassium silicate binder. The amount of such particles distributed in the binder of the above white paint can range from about 50 to about 90%, preferably from about 75 to about 85%, e.g. about 80%, by weight of the total mixture of particles and binder of the paint. Other white inorganic paints suitable as a thermal control coating can be employed, including, for example, various types of silicate based paints.

The inorganic white paint is applied to the anodic coating on the anodized aluminum or aluminum alloy substrate, by spraying. The spray mixture is prepared, for example, by adding the particles, such as zinc oxide particles, to a commercially available aqueous solution of potassium silicate. If desired, additional water can be added to the mixture to prepare a readily sprayable white paint formulation. If desired, such paint formulation can also be applied to the anodized aluminum or aluminum alloy substrate by brushing or dipping.

Following application of the inorganic white paint topcoat on the anodized aluminum or aluminum alloy substrate, the paint is dried or cured, e.g. at ambient temperature in a controlled humidity environment. In the case where Z-93 white topcoat has been applied, curing thereof can be achieved in a 40 to 70% humidity environment at a temperature between 60° and 80° F. for 7 days.

The anodized aluminum substrate topcoated with an inorganic white paint according to the invention has a low solar absorptance ranging from about 0.15 to about 0.20, and a high infrared emittance ranging from about 0.90 to about 0.92. The overall thickness of the anodic coating and the inorganic white topcoat can range from about 1.5 to about 8 mils. For thick white coatings, overall thickness can be, e.g. 5 to 7 mils and for thin white coatings, overall thickness can be, e.g. about 1.5 to about 2.5 mils, e.g. about 2 mils.

The anodic coating of the invention is useful for all spacecraft thermal control surfaces where low solar absorptivity and high infrared emissivity are required. The anodic coatings of the invention can also be used in the terrestrial environment, including indoor or outdoor architectural or domestic application.

The following are examples of practice of the invention:

EXAMPLE 1

A sample of 5657 aluminum alloy was alkaline cleaned by immersion in a solution of Turco 4090 for 15 minutes at 200° F. and rinsed with tap water. Then, it was chemically brightened by immersion in a solution of 85 parts of reagent grade phosphoric acid and 15 parts of reagent grade nitric acid by weight at 200° F. for 45 seconds. The sample was then rinsed with tap water.

After bright dipping, the aluminum alloy sample was anodized in a 15% by weight of reagent grade sulfuric acid anodized electrolyte in a temperature controlled lead tank. The anodizing bath temperature was 30° C. The power was supplied by a 40-volts, direct current 10 amperes power source using the lead tank as the cathode and the sample part as the anode. The step-wise current density procedure was carried out at 19 amperes per square ft. (ASF) for 20 minutes, 15 ASF for 20 minutes, and 10 ASF for 20 minutes. After anodizing, the sample was sealed by immersion in a demineralized water bath at 200° F. for 5 minutes. The sample was then air dried.

The anodic coating produced had a thickness of 1 mil.

This anodizing procedure is described and claimed in an application entitled "Process for Producing A High Emittance Coating and Resulting Article", by H.G. Le and D.L. O'Brien, Ser. No. 876,768 filed May 1, 1992, now U.S. Pat. No. 5,217,600, and assigned to the same assignee as the present application.

The anodic coating produced on the 5657 aluminum alloy substrate was coated with Z-93 white paint by spraying. The spray solution of the white paint was prepared from the proprietary Z-93 white paint material containing separately packages of zinc oxide particles and 35% aqueous potassium silicate solution, by mixing the zinc oxide particles with the 35% aqueous potassium silicate solution. Additional water was added to the mixture so that the final formulation was comprised of 44% zinc oxide, 10% potassium silicate and 46% water, by weight.

The resulting mixture was sprayed from a low pressure spray gun onto the aluminum alloy substrate, using a filtered air line. The substrate was placed in a horizontal orientation, with the spray nozzle maintained within about 12 inches of the substrate, during application.

After application of the Z-93 white paint coating to the anodic coating on the substrate, the resulting multilayer coated substrate was allowed to cure for 24 hours at a temperature of about 75° F. and a relative humidity of about 65%, and the coated substrate was bagged and sealed in a polyethylene bag for 7 days.

A paint layer 1 mil in thickness was formed over the anodic coating on the substrate, the total thickness of both the anodic layer and the white paint layer thus being 2 mils. The optical properties of the anodized coating alone were solar absorptivity of 0.22 and infrared emissivity of 0.90. The two layer coating on the 5657 aluminum substrate in comparison had a lower solar absorptivity of only 0.15 and high infrared emissivity of 0.9.

In order to have comparable optical properties on a bare 5657 aluminum alloy substrate without an anodic coating, it was necessary to coat the bare aluminum alloy with the Z-93 inorganic white paint to a thickness of 7 mils. This results in a 5-mil saving in coating weight employing the two layer anodic coating-white paint concept of the present invention as compared to use of a single inorganic white paint layer on the aluminum alloy substrate, which is highly significant for saving weight for space applications, particularly for large area radiators.

EXAMPLE 2

A sample of 5657 aluminum alloy is alkaline cleaned substantially according to the procedure of Example 1.

After bright dipping, the aluminum alloy sample is then anodized in a sulfuric acid electrolyte using 18% by weight sulfuric acid at room temperature. The voltage applied is 15 volts direct current and the current density approximately 12 to 13 ASF. Anodizing is carried out for a period of 45 minutes, followed by sealing the anodized surface in hot demineralized water for 5 minutes at 200° F., followed by air drying.

The anodic coating produced on the 5657 aluminum alloy substrate is top coated with Z-93 white paint substantially according to the procedure of Example 1.

The total thickness of the two layers of anodic coating and white paint is 2 mils, with 1 mil thickness of anodic coating and 1 mil thickness of the white paint coating, as in the two layer coating of Example 1. While this two layer coating also has a low absorptance of about 0.15 similar to Example 1, the emissivity of the anodic coating prior to topcoating is of the order of about 0.8, and after spraying on the inorganic white coating an emissivity of 0.9 is obtained for the two layer coating identical to that of Example 1.

EXAMPLE 3

Samples of an aluminum alloy sheet of 2014-T6 were anodized. The standard pre-treatments of cleaning to remove contaminants, rinsing, etching and rinsing were conducted prior to anodizing. The samples were then sulfuric acid anodized using a direct current electrolysis. A sulfuric acid bath concentration of 18% was used. The anodizing voltage was maintained constant at about 15 volts. This results in an approximate current density of 12 to 13 ASF. The bath temperature was between 70° and 80° F. The samples were anodized for about 45 min., rinsed, then hot-water sealed in a deionized water bath between 180° and 210° F. for about 10 min. and air dried. An anodic coating thickness of 0.3 mils was obtained.

The solar absorptance and infrared emittance were $\alpha=0.36$ and $\epsilon=0.80$, as anodized. A thin coating of the inorganic paint, Z-93 approximately 1.5 to 2.0 mils, was applied to the anodic coating, as in Example 1. The optical properties after the application of the Z-93 top coat were $\alpha=0.19$ and $\epsilon=0.92$.

EXAMPLE 4

The same processing procedure as described in Example 3 was applied to 2219-T37 aluminum alloy. The optical properties after anodizing were $\alpha=0.36$ and $\epsilon=0.78$. The anodic coating thickness was 0.3 mils. After the application of a Z-93 top coat the optical properties were $\epsilon=0.17$ and $\alpha=0.92$.

EXAMPLE 5

The same processing procedure as described in Example 3 was applied to 5052-H34 aluminum alloy. The optical properties after anodizing were $\alpha=0.32$ and $\epsilon=0.83$. The thickness of the anodic coating was 0.7 mils. After the application of a Z-93 top coat the optical properties were $\alpha=0.17$ and $\epsilon=0.92$.

EXAMPLE 6

The same processing procedure as described in Example 3 was applied to 6061-T6 aluminum alloy. The optical properties after anodizing were $\alpha=0.38$ and $\epsilon=0.82$. The anodic coating thickness was 0.5 mils. After the application of a Z-93 top coat the optical properties were $\alpha=0.20$ and $\epsilon=0.92$.

EXAMPLE 7

The same processing procedure as described in Example 3 was applied to 6061-T6 aluminum alloy with the exception that no hot water sealing was used prior to the application of the Z-93. The optical properties after anodizing were $\alpha=0.49$ and $\epsilon=0.83$. The optical properties after the application of a Z-93 top coat were $\alpha=0.16$ and $\epsilon=0.92$. The thickness of the Z-93 coating was 2.1 mils.

The emittance ($\epsilon$) of an unanodized (bare) sample of the same material was only $\epsilon=0.03$. After the application of a Z-93 top coat, the emittance was $\epsilon=0.91$.

EXAMPLE 8

The same processing procedures as described in Example 3 was applied to 6061-T6 aluminum alloy with the exception that a 5 to 6 mil thick coating of Z-93 was applied. The optical properties after anodizing were identical to that of Example 6, $\alpha=0.38$ and $\epsilon=0.82$. After the application of the Z-93 coating, optical properties of $\alpha=0.15$ and $\epsilon=0.92$ were obtained. For this thickness of the inorganic white paint, corrosion protection is provided by the anodic coating.

From the foregoing, it is seen that the invention provides a low absorptance high emittance thin coating of reduced weight on an aluminum or aluminum alloy substrate by first anodizing the substrate, followed by applying a topcoat of an inorganic white paint on the anodic coating.

Since various changes and modifications of the invention will occur to those skilled in the art within the spirit of the invention, the invention is not to be taken as limited except by the scope of the appended claims.

What is claimed is:

1. An article having a high infrared emittance low solar absorptance coating, which comprises a substrate formed of aluminum or an aluminum alloy having an anodized surface and a topcoat of an inorganic white paint on the anodic coating of said anodized surface, wherein said inorganic paint is comprised of a member selected from the group consisting of (1) a potassium silicate binder having zinc oxide particles distributed therein, and (2) a potassium silicate binder having zinc orthotitanate particles distributed therein, the amount of said particles in said binder ranging from about 50 to about 90% of said particles by weight of the total mixture of said particles and binder, wherein the total thickness of the anodic coating and said white paint topcoat ranges from about 1.5 to about 8 mils, and wherein the overall coating has a solar absorptance of about 0.15 to about 0.20, and a infrared emittance of about 0.90 to about 0.92.

2. The article of claim 1, wherein said substrate is an aluminum alloy.

3. The article of claim 2, wherein said aluminum alloy is 6061-T6 aluminum alloy.

4. The article of claim 1, wherein said inorganic paint is comprised of a potassium silicate binder having zinc oxide particles distributed therein.

5. The article of claim 4, wherein said substrate is an aluminum alloy.

6. The article of claim 1, wherein the total thickness of the anodic coating and said white paint topcoat ranges from about 1.5 to about 2.5 mils.

7. The article of claim 2, wherein said aluminum alloy is 6061-T6 aluminum alloy, and wherein said inorganic paint is comprised of a potassium silicate binder having zinc oxide particles distributed therein and wherein the coating has a solar absorptance of about 0.16 and an infrared emittance of about 0.92.

* * * * *